(12) United States Patent
Cournoyer et al.

(10) Patent No.: US 8,295,579 B2
(45) Date of Patent: Oct. 23, 2012

(54) OBSTRUCTION DETECTOR

(75) Inventors: Alexis J. Cournoyer, Portsmouth, RI (US); Frank Metayer, Westerly, RI (US); Carlos Cervantes Toral, Barcelona (ES)

(73) Assignee: GTECH Corporation, Providence, RI (US)

( * ) Notice: Subject to any disclaimer, the term of this patent is extended or adjusted under 35 U.S.C. 154(b) by 449 days.

(21) Appl. No.: 12/427,854

(22) Filed: Apr. 22, 2009

(65) Prior Publication Data

US 2010/0272314 A1    Oct. 28, 2010

(51) Int. Cl.
*G06K 9/00* (2006.01)
(52) U.S. Cl. .......................................... 382/141
(58) Field of Classification Search .......... 382/141–152; 356/71
See application file for complete search history.

(56) References Cited

U.S. PATENT DOCUMENTS

| | | | | |
|---|---|---|---|---|
| 4,566,125 A | * | 1/1986 | Clunn | ............................ 382/151 |
| 2009/0027734 A1 | | 1/2009 | Bozzi et al. | |

FOREIGN PATENT DOCUMENTS

| | | | |
|---|---|---|---|
| EP | 0 240 203 A2 | 10/1987 | |
| EP | 0 587 484 A1 | 3/1994 | |
| EP | 1 052 593 A2 | 11/2000 | |
| FR | 2 661 529 A1 | 10/1991 | |
| GB | 957 443 A | 5/1964 | |
| GB | 2 255 473 A | 11/1992 | |

OTHER PUBLICATIONS

International Search Report and Written Opinion mailed Jul. 26, 2010, International Application No. PCT/US2010/031730.
Pizano, A. et al., "A Business Form Recognition System," Computer Software and Applications Conference, 1991, COMPSAC '91, Proceedings of the Fifteenth Annual International Tokyo, Japan, Sep. 11-13, 1991, Los Alamitos, CA, IEEE Comput. Soc.
Pizano, A., "Extracting Line Features from Images of Business Forms and Tables," Pattern Recognition, 1992, vol. III, Conference C: Image, Speech and Signal Analysis, Proceedings, $11^{th}$ IAPR International Conference on the Hague, Netherlands, Aug. 30-Sep. 3, 1992, Los Alamitos, CA, USA, IEEE Comput. Soc.

* cited by examiner

*Primary Examiner* — Michael P Stafira
(74) *Attorney, Agent, or Firm* — McCarter & English, LLP; Kia L. Freeman, Esq.

(57) ABSTRACT

An optical reader of a form is discussed where the form has a stored known boundary or boundaries. When the boundaries in a captured image do not match those of the stored known boundaries, it may be determined that an obstruction exists that will interfere with a correct reading of the form. The boundary may be printed, blank, and may include quiet areas, or combinations thereof in stored known patterns. A captured image of the form is compared to retrieved, stored boundary information and differences are noted. The differences may be thresholded to determine if an obstruction exists. If an obstruction is detected, the operator may be signaled, and the location may be displayed or highlighted. The form may be discarded or obstruction may be cleared and the form may be re-processed.

16 Claims, 5 Drawing Sheets

OBSTRUCTION DETECTOR

BACKGROUND OF THE INVENTION

The present invention is related to a patent application entitled "Curvature Correction and Image Processing", which has been assigned Ser. No. 12/323,701, was filed on Nov. 26, 2008, and is of common ownership with the present application. This earlier application is incorporated herein by reference.

FIELD OF THE INVENTION

The present invention relates to reading forms, and more particularly to detecting and reporting when a "foreign object" overlays at least some part of a form and may interfere with a correct reading of the form.

BACKGROUND INFORMATION

Printed documents, such as play slips, lottery scratch tickets, instant tickets and the like, are collectively defined herein as "forms." Often forms have man-made marks at locations indicating a specific human intent. Correctly identifying a form and reading or processing the printed and man made markings are important non-trivial tasks.

Some of these tasks include detecting the presence of a form, determining that the form is motionless, locating and identifying marks on the form, and then interpreting the meaning of the marks.

Forms may be identified by printed markings that are read and interpreted, or a human may indicate the form type. The printed markings normally will include logos or other special marks. In addition, alignments marks may be printed and used by processing equipment to accurately identify locations on the form. The known form and the recognized markings identify locations that are accurately read and interpreted for their meanings.

Typically, reading a form begins with a photo-sensitive device or camera or the like that captures an image of the form. The captured image may be downloaded, stored and analyzed by a computing system running a software application, firmware embedded in a hardware framework, a hardware state machine, or combinations thereof as known to those skilled in the art.

Some form reading systems include an open platen upon which a form is simply laid. The sides of such a system may be open where the form is inserted, but access to the platen may be open on three or even all four sides. An issue that is best illustrated with these open platen readers, but that may be inherent in any reader, is to detect and react to any "foreign obstruction" that may obscure some part of the digitized image of the form during the form reading process.

Although open platen form readers may be more prone to obstructions interfering with reading forms, such obstructions may occur with any reader, including tractor-type readers that deliver the form to a controlled environment for reading.

Herein, "foreign obstruction" refers to any physical object or thing lying on the form, or to virtually anything that may obscure the digital image of the form; including, e.g., shadows, sun light, bright lights, reflections, or human fingers or hands which, in whole or in part, hold or interfere with and otherwise obscure at least some portion of the image of the form. Often, for example, a user may keep their hand on the form as it is read in anticipation of removal of the form after reading. In such situations, their hand may become the foreign obstruction or object, which results in rejection of the form.

In some cases, a form may be designed with a border or other printed device to help detect foreign obstructions; but since many existing forms might be processed, the present invention provides for detecting foreign on virtually any form.

SUMMARY OF THE INVENTION

The present invention assumes that the type of form is known, and that the locations of boundaries, logos, alignment marks, and any other relevant areas of interest on the form are known and stored as model image of the form type in a computer system.

For each type of form, a boundary is established often near areas of interest. The boundary may be a printed line that tracks around the entire form or parts of the form, or it may be non-contiguous "quiet areas" distributed on the form, or it may be a known pattern distributed on the form. The "quiet areas" may be blank (with no printed or man-made marks) areas that produce a constant image content with no edge, while a known pattern will produce edges at known locations on the form. A "quiet area" may be termed a virtual boundary, as compared to a printed boundary.

Illustratively, after a digitized image of the form is captured, the present invention downloads the stored model information regarding that form, including boundaries and parameters. The system detects an anomaly in the expected boundary, for example, when an unexpected edge appears or an edge does not appear where expected. Such occurrences indicate an obstruction is present. Illustratively, the detection is found from a contrast change, or lack of change from pixel to pixel, or over a series of pixels, that define a boundary.

In other embodiments, captured image data could be examined for unexpected forms that may be identified as foreign obstructions. For example, the form of a finger may be detected even if it does not interfere with a boundary condition.

The "quiet area" boundary may be only one pixel wide or it may be many pixels wide, and the boundaries need not have uniform width and they need not be contiguous. In other embodiments, combinations of printed contiguous and non-contiguous lines, and quiet areas may be used in combination a boundary.

In one application, the detection of a foreign obstruction may signal the user or local agent to remove the obstruction, and the system may indicate or highlight the area where the obstruction was detected. Where the system includes a display, the form may be displayed with the obstruction highlighted, or a LED may illuminate the part of the physical form highlighting the obstructions. A message, e.g., a text message, indicating the location of the obstruction may also be used.

In other embodiments, the boundary may be colored and may have a known design or pattern, for example, a series of dashes where the length of the dash, the distance between dashes, and the track of the dashes may be known. The obstruction detector knows the pattern, its location and parameters and detects an obstruction when the image does not follow the expected pattern and data. The parameters also may include optical intensity, known edge locations, etc.

In other embodiments, a beam of light, e.g., an infra-red light, may illuminate a portion or portions of the form where the light from the form is captured by a camera and interpreted as a boundary.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
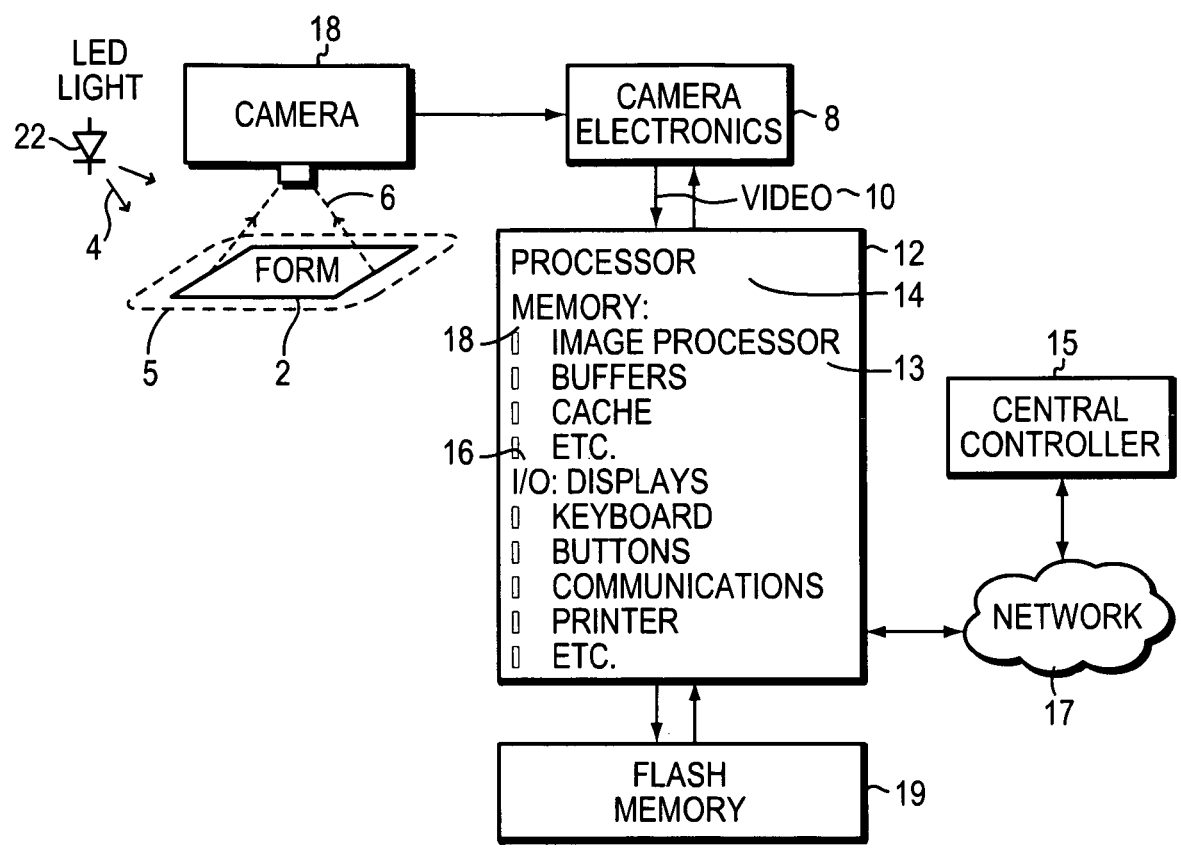
FIG. 1 is block diagram of a system embodying the present inventions.

FIG. 1 illustrates a system where an example of a known form 2 may be illuminated by light 4 from a light source 22 and the light 6, which is reflected from the form 2, is received by a camera 18. The example form 2 is located on a platen 5, which may be positioned below the camera 18. The camera includes a photo-sensitive surface (not shown), and an image of the form 2 is impressed on the camera's photo-sensitive surface. The image may be downloaded (scanned, read-out) by electronics 8 to produce a video signal 10. The video signal 10 may be digitized and stored as pixels or pixel data, where a processor 14 disposed within a computer system 12 operates on the pixel data. The computer system 12 includes memory 18 and I/O drivers 16 for handling, at least, displays, keyboards, buttons, and communications. The computer system 12 may be connected to a network 17 that communicates with a central controller 15.

Memory 18 may include one or more image buffers, other buffers, cache, etc. An operating system and software applications also may be stored in memory 18. An image processing application 13, discussed below, may include functionality for processing the image data for foreign obstructions.

Figure 2:
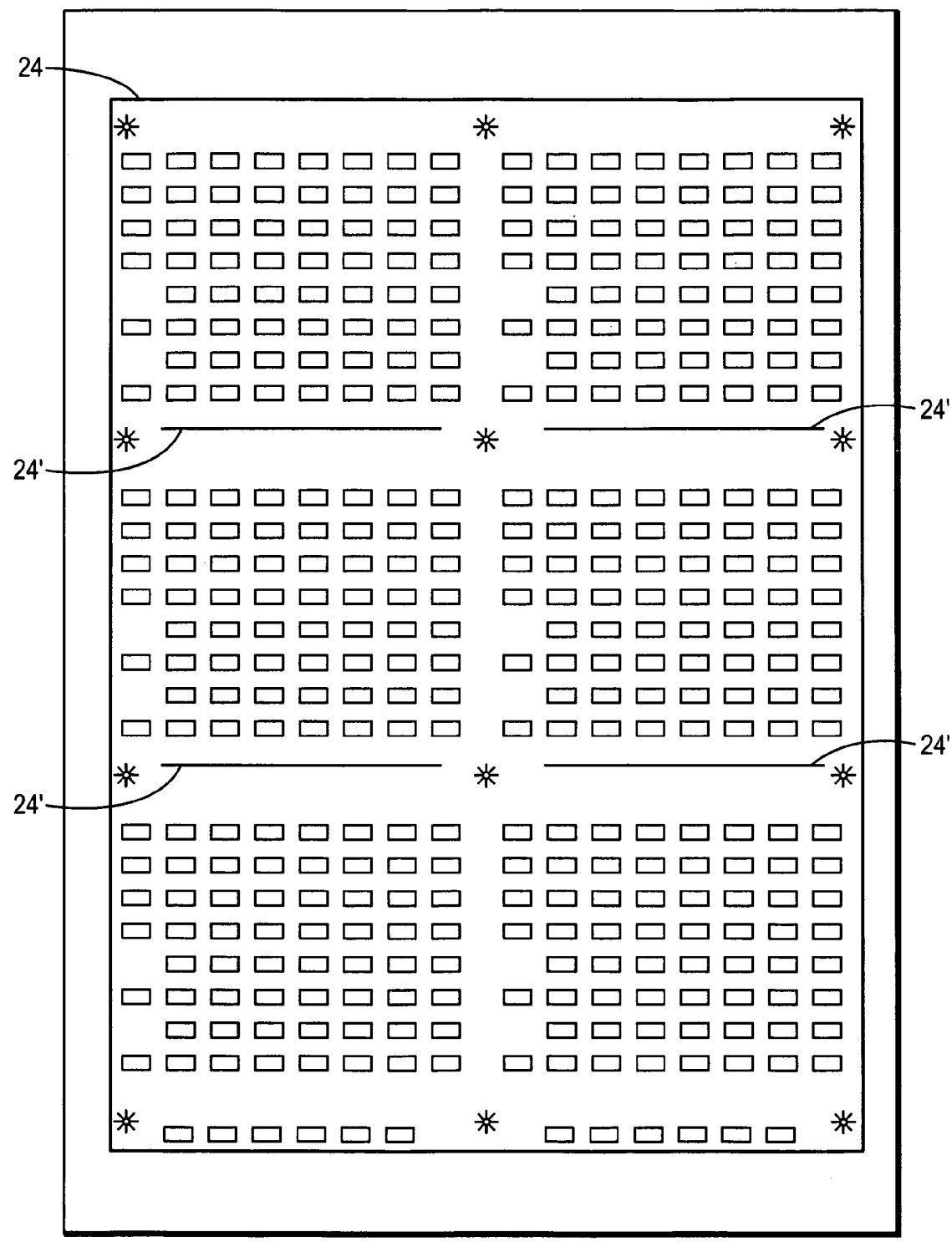
FIG. 2 is a drawing of a form that may be read by the system of FIG. 1.

FIG. 2 is an exemplary blank form lottery card. In this lottery card, a visible continuous line 24 surrounds the entire printed areas where a human would make marks. If the line 24 is not continuous or shows contrast changes, or does not comprise a joined series of straight lines with right angle corners, a foreign obstruction may be determined to be present. There may be other line segments 24' within the printed area that may be used as references with which to detect anomalies listed herein that may indicate a foreign obstruction exists. Any mark or printed boundary in a captured image may be digitally stored for each pixel in memory, usually, as a binary number. Herein, a digital number for each pixel in a captured image is described as an "optical intensity."

Figure 3:
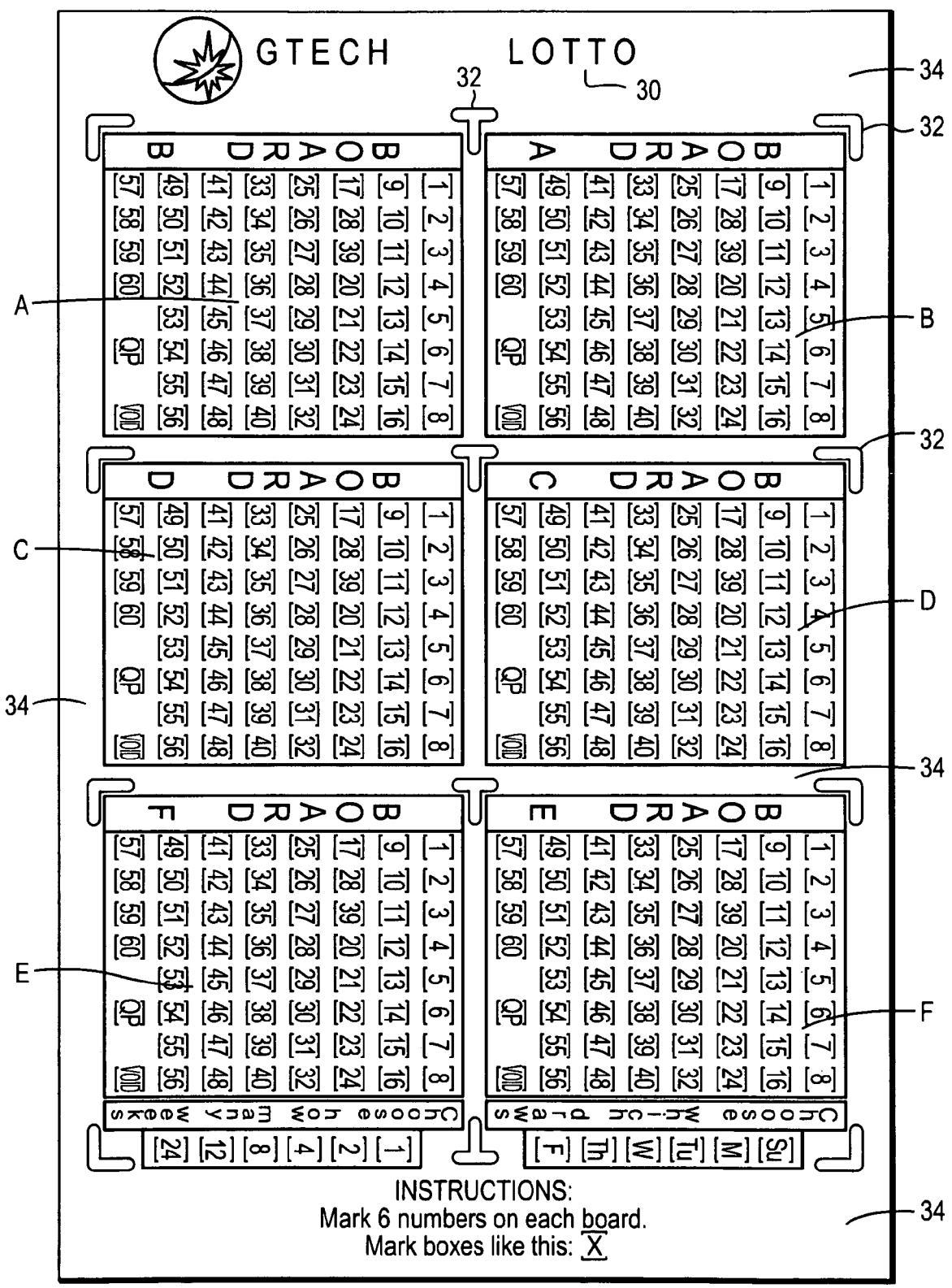
FIG. 3 is another drawing illustrating a form that may be read by the system of FIG. 1.

FIG. 3 illustrates an exemplary printed lottery card, such as may be printed by GTECH Printing Corporation of Providence, R.I. The lottery card may include an identifying logo 30, and may further include (not shown) printed marks or bar codes, etc., that identify the specific lottery card. An agent may physically input the type of form to the computer system, but in other examples some identifying mark may be captured by the camera and compared to a library of all known identifying marks from model forms to determine the form type.

The lottery card also includes alignment and/or registering marks 32 that are distributed around the card. The alignment/registration marks 32 define six Boards A, B, C, D, E, and F. In using this card, a person may enter information within any one or all of the six Board grids. There are blank areas 34 surrounding the entire area enclosed by the alignment marks 32, and further blank areas 34 between the six Boards. The blank areas 34 may be used as quiet area boundaries.

Figure 4:
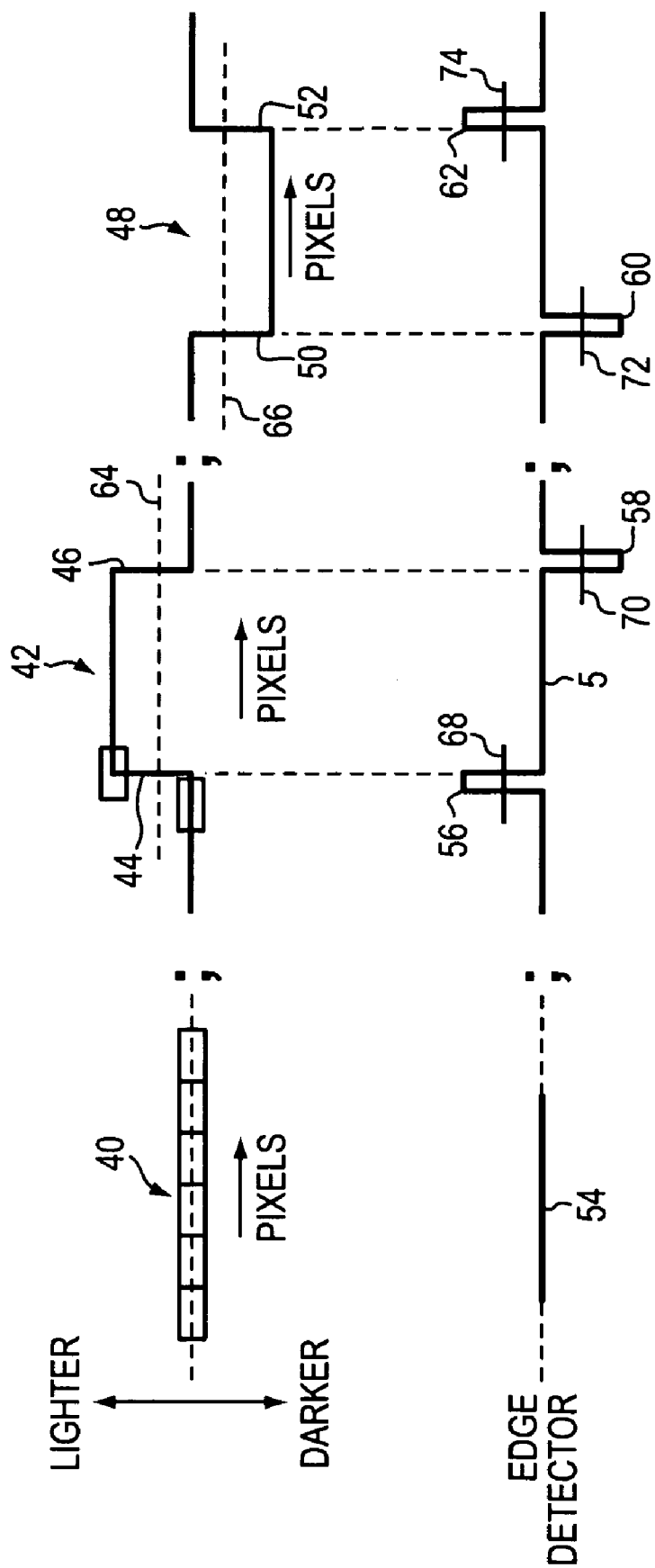
FIG. 4 is an illustration of contrast edges that may be found on a boundary.

FIG. 4 illustrates stored digital image optical intensities for three representative groups of contiguous boundary pixels. The groups are, 40, 42 and 48. The contiguous pixels 40 are along part of a boundary where each pixel is at the same optical intensity. For this group of pixels 40, the boundary is intact and no foreign obstruction is present. The second group of contiguous boundary pixels 42 represents a brighter light beam that intersects the boundary group of pixels 42 from pixel 44 to 46. This may represent a "foreign obstruction" that may interfere with proper reading of the form 2. The last group of contiguous boundary pixels 48 represents a shadow intersecting the boundary pixels from 50 to 52, and also may represent a foreign obstruction. The boundary group of pixels 50 to 52 may be a shadow or it may be a physical object, like a finger.

The detection of edges is illustrated just below the pixel groups 40, 42 and 48, respectively. According to this process, just the change of optical intensity is retained; and, not the actual optical intensities. So, according to this example, for the group 40, no edges are detected 54. For the group 42, edges 56 and 58 are detected. And, for group 48, edges 60 and 62 are detected.

In one embodiment, the lighter to darker edge 44 may be detected from the image data by establishing a threshold 64; and, for the group 48, the threshold may be 66. Thresholds may be established for the edge data in a similar manner. So, for example, thresholds 68, 70, 72 and 74 may be used to detect corresponding edges 56, 58, 60 and 62.

FIG. 4 illustrates the lighter/darker levels of the digitized pixels, but the actual analog signals for the pixels may be handled in a similar fashion where the thresholds 44, 66, 68, 70 and 72 are analog values using, for example, an analog comparator.

With respect to quiet areas 34 as shown in FIG. 3, the boundary of quiet areas may be non-contiguous area where all the image pixels within contours of such a quiet area must have the same optical intensity. Note that, although an isolated portion of a quiet area 34 is shown, that area may be as small as a single pixel. The shape, location, length or width or area of quiet areas may be of virtually any value.

In another embodiment, referring to FIG. 1, the light 22, may include an infra-red LED laser, that may be projected from above, or below, the form 2. The light 6 may be reflected, or passed through, to the camera 18. The light 22 also may be arranged to illuminate a particular pattern that defines a boundary on the form 2. The captured image will have that light path that can be processed by the processor 14 as a boundary. For example, if an obstruction intersects the light 6 before or after reflecting from the form 2, the expected pattern of the light path is interrupted and an obstruction is inferred. Once captured, the light path may be processed as an example of any of the boundary forms discussed herein, e.g., a line, a non-contiguous line, a quiet area, a pattern, or a combination thereof.

For any known model of the form 2, the boundaries (any and all types), their locations and their other parameters are known and stored, as are the location of any alignment or other types of marks, e.g., logos. The other parameters of the boundaries include, but are not limited to, the types of boundary, the dimensional details of the boundary (line width, height, angles, area, shape), their expected optical intensities, their patterns, etc. The stored parameters of boundaries may include their locations, but the locations may be stored separately.

Figure 5:
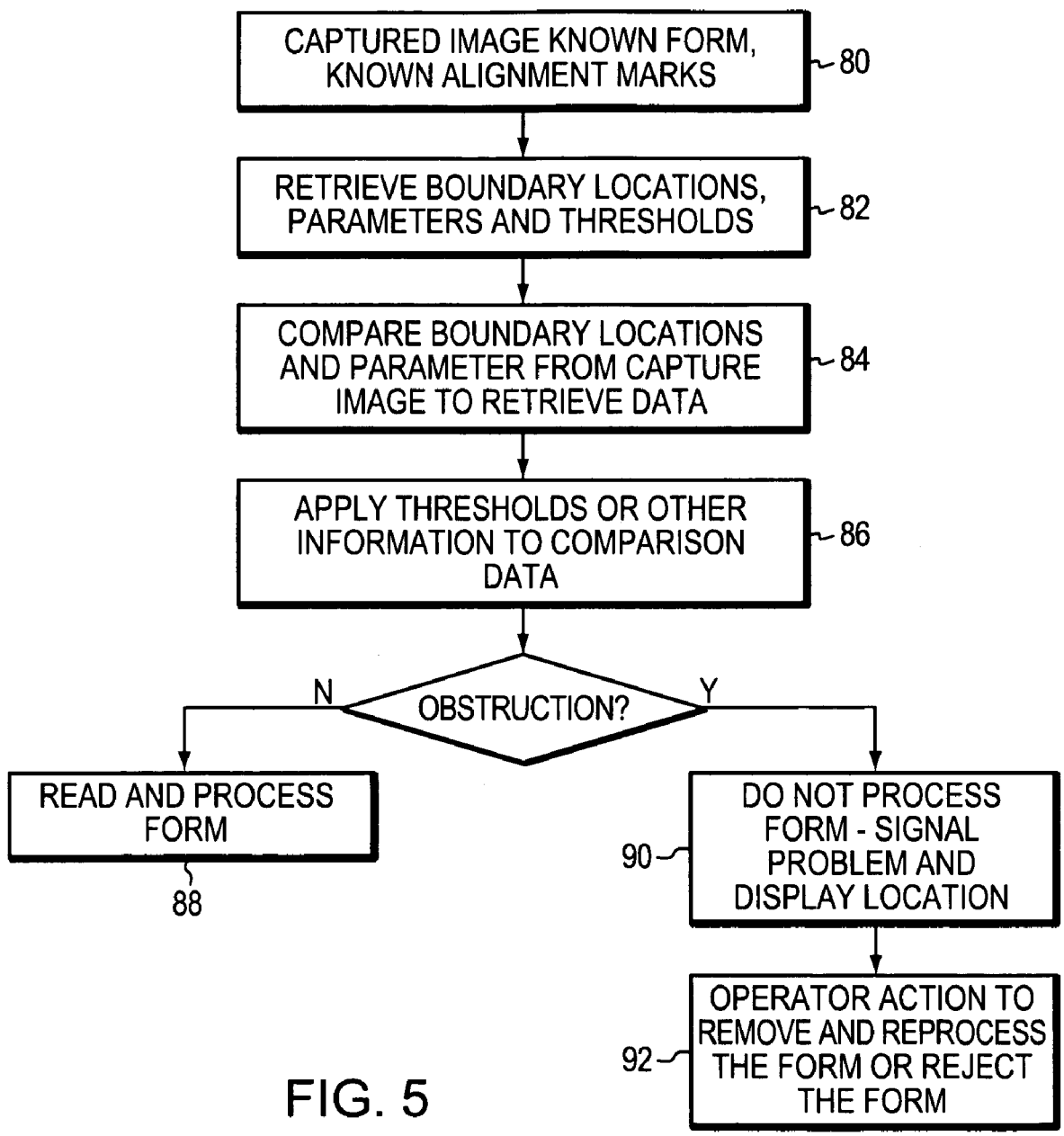
FIG. 5 is flow chart illustrating the present invention.

FIG. 5 is a flow chart illustrating a method for processing captured pixel data of a known form according to the present invention. In broad terms, a boundary exists and the location, type of boundary, and other parameters are stored and known to the processing system. Where applicable, thresholds may also be stored and available to the processing system.

In a first step 80 of the method, an image of a known form is captured by the photo-sensitive camera to produce a digital image of the form. In step 82, the detailed locations and parameters for a boundary or boundaries for the form are retrieved from a stored model of that form. Then, in step 84, the boundary location and parameters of the captured image are compared to the retrieved data. Once the comparison is completed, in step 86, thresholds may be applied to the comparison data and an obstruction may be detected. Other criteria may be used, rather than thresholds, for example, where a shape is detected and deemed an obstruction. If no obstruction is detected, the form is read and processed 88. If an obstruction is detected, however, the form is not processed and the problem is signaled and/or displayed 90 such that an operator can take action to correct the problems or remove the form. For example, if the obstruction type is known, that information may be displayed for the operator or the user. For example, if a finger outline was detected on the captured image, it may be so displayed. If the problem is corrected the form may be reprocessed 92.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A method for detecting obstructions in reading an example of a known form, the method comprising the steps of:
   retrieving from memory and processing stored locations and parameters of boundaries of a model of the known form;
   capturing an image of the example of the known form;
   comparing the locations and parameters of the boundaries of the model of the known form to the corresponding locations and parameters of the captured image; and
   determining with a processor, from the step of comparing, whether any physical object or thing is obscuring at least a portion of the boundaries.

2. The method of claim 1 further comprising the step of signaling that an obstruction is present if it is determined that a physical object or thing is obscuring at least a portion of the boundaries.

3. The method of claim 1 wherein the step of comparing includes comparing optical intensity data of the retrieved model and the captured form images.

4. The method of claim 1 wherein the stored locations and parameters are digital numbers and further comprising the step of digitizing the captured image.

5. The method of claim 4 further comprising the steps of: retrieving digital thresholds; applying the digital thresholds to any differences found in the step of comparing; and when a digital threshold is met, determining that at least a portion of the boundaries is obscured.

6. The method of claim 1 further comprising the steps of: projecting a light onto the form, wherein the light illuminates a path, and receiving light reflected from the path, the reflected light from the path comprising a boundary.

7. The method of claim 1 wherein the boundary is selected from the group consisting of a printed line, a quiet area, a printed pattern, and a known shape.

8. The method of claim 1 further comprising the steps of: signaling an operator if it is determined that a physical object or thing is obscuring at least a portion of the boundaries; and highlighting the location of the obscured portion of the boundaries.

9. A system for detecting the presence of an obstruction in reading an example of a known form, the system comprising:
   a camera that captures light reflected from the example of a known form, the reflected light forming an optical image of the example of the known form;
   a digitizer that converts the optical image into a digital image of digital numbers that represents the captured light intensity;
   a computer system having memory that receives and stores the digital numbers, wherein the memory also contains locations and parameters of boundaries associated with a model of the known form, and wherein the computer system processes the digital numbers to generate locations and parameters for the captured example of the known form; and
   a comparator that compares the locations and parameters of boundaries associated with the model to the locations and parameters of the captured example, wherein a difference in the comparison indicates the presence of any physical object or thing that is obscuring at least a portion of the boundaries.

10. The system of claim 9 further comprising an output that signals the presence of the obstruction if the comparator indicates that a physical object or thing is obscuring at least a portion of the boundaries.

11. The system of claim 9 further comprising stored thresholds that are applied to the differences, wherein when a threshold is met the system determines at least a portion of the boundaries is obscured.

12. The system of claim 9 further comprising a light that illuminates a boundary of the known form, and a receiver for the light that illuminates the boundary.

13. A non-transitory computer readable media comprising: executable program instructions for detecting obstructions in the reading an example of a known form, the executable program comprising the steps of:
   retrieving and processing stored locations and parameters of boundaries of a model of the known form;
   capturing an image of the example of the known form;
   comparing the locations and parameters of the boundaries of the model of the known form to the corresponding locations and parameters in the captured image, and
   determining, from the step of comparing, whether or not any physical object or thing is obscuring at least a portion of the boundaries.

14. The computer readable media of claim 13 wherein the executable code further comprises the step of signaling that an obstruction is present when at least a portion of the boundaries is obscured.

15. The method of claim 1 wherein the identity of the example of the known form is determined by the step of capturing a first image of the example of a known form, and detecting marks that identify the known form.

16. The system of claim 9 further comprising marks on the example of the known form that identify the known form.

\* \* \* \* \*